Jan. 17, 1939.  N. A. LUDINGTON  2,144,410
LOAD BOX AND METHOD OF TRANSPORTING THE SAME
Filed Jan. 22, 1935  4 Sheets-Sheet 1
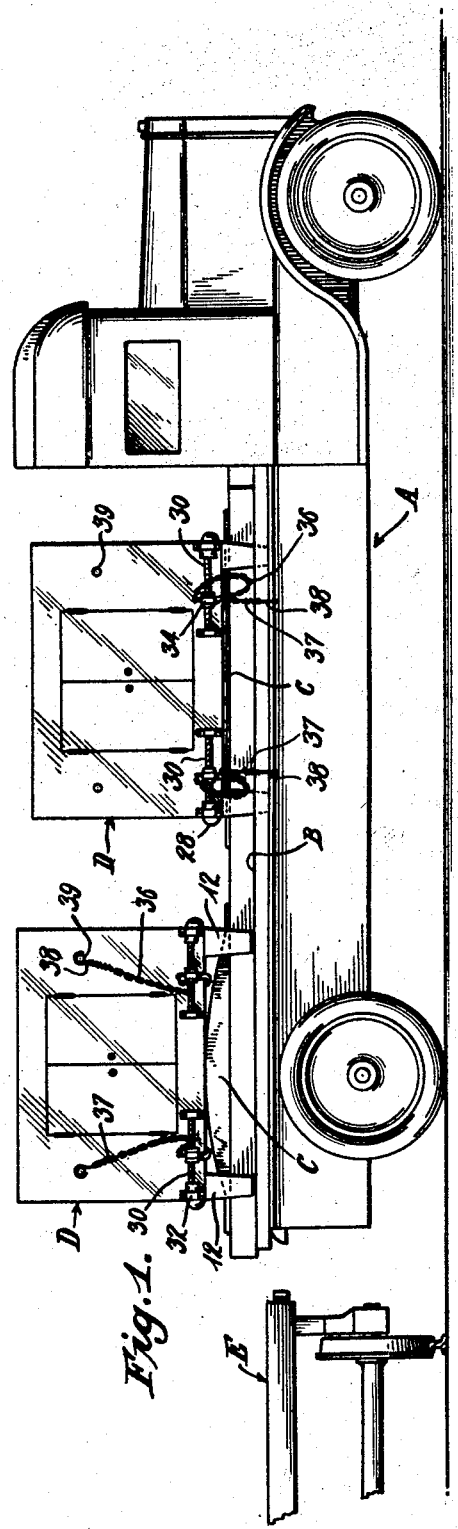
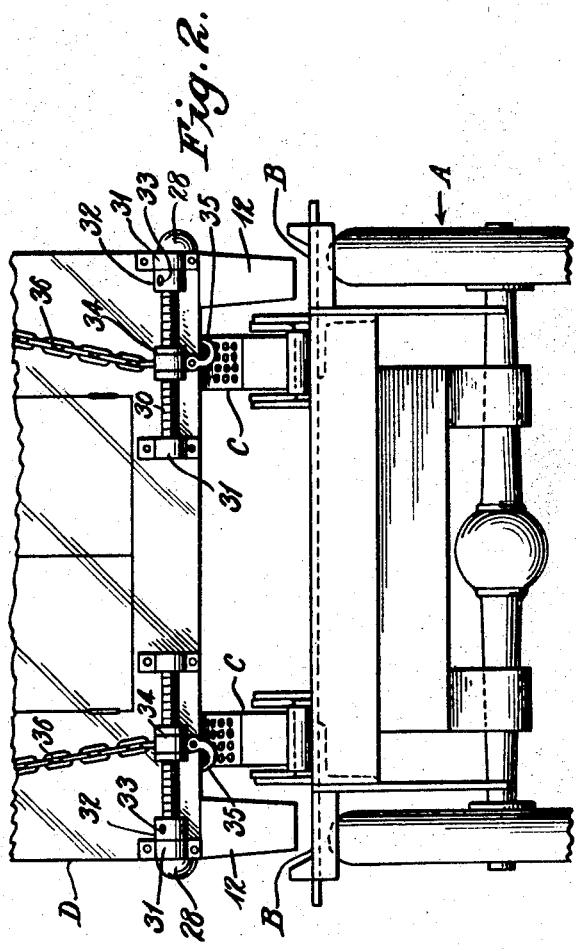
Inventor
Nelson A. Ludington
By Bacon & Thomas
Attorney

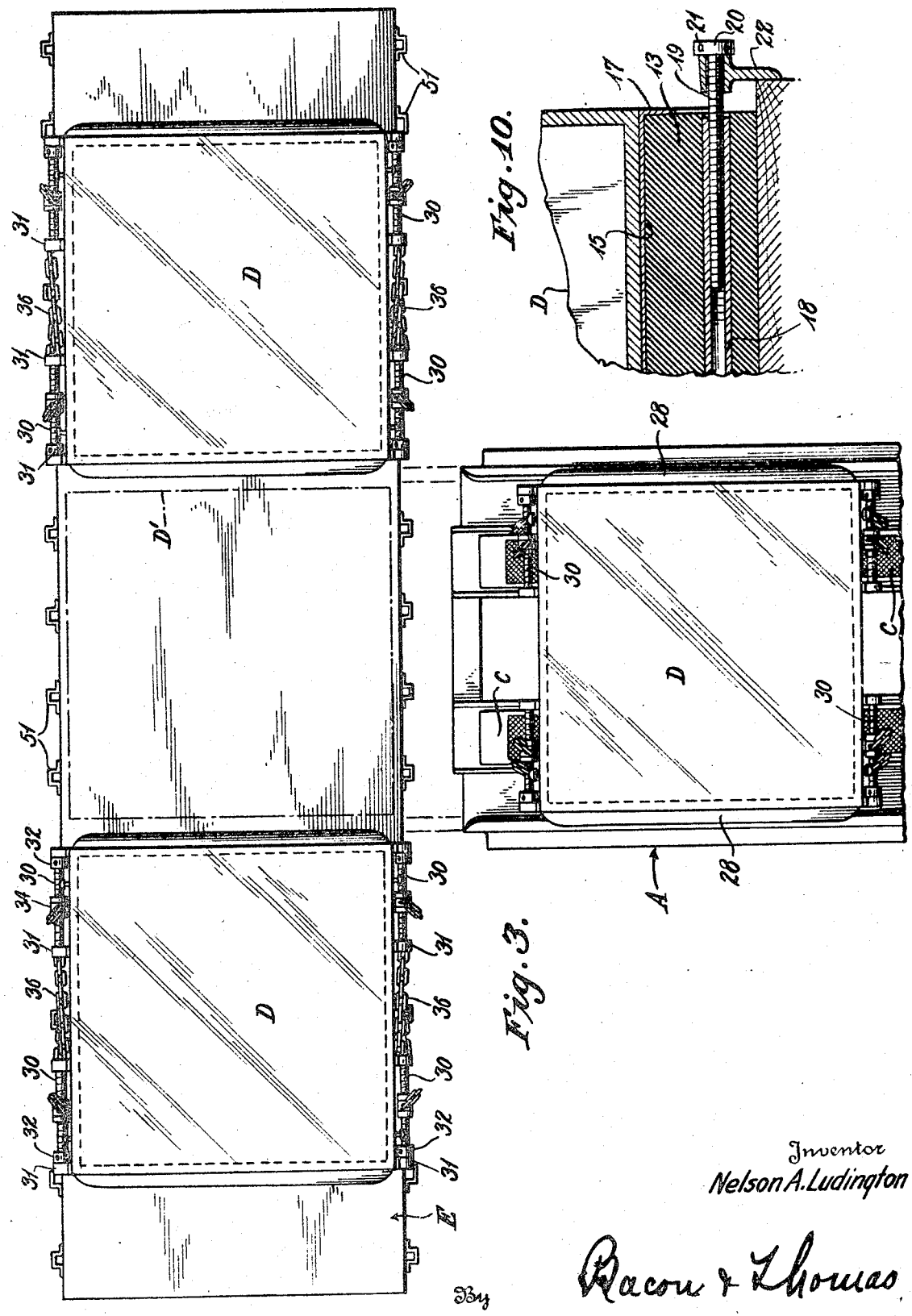

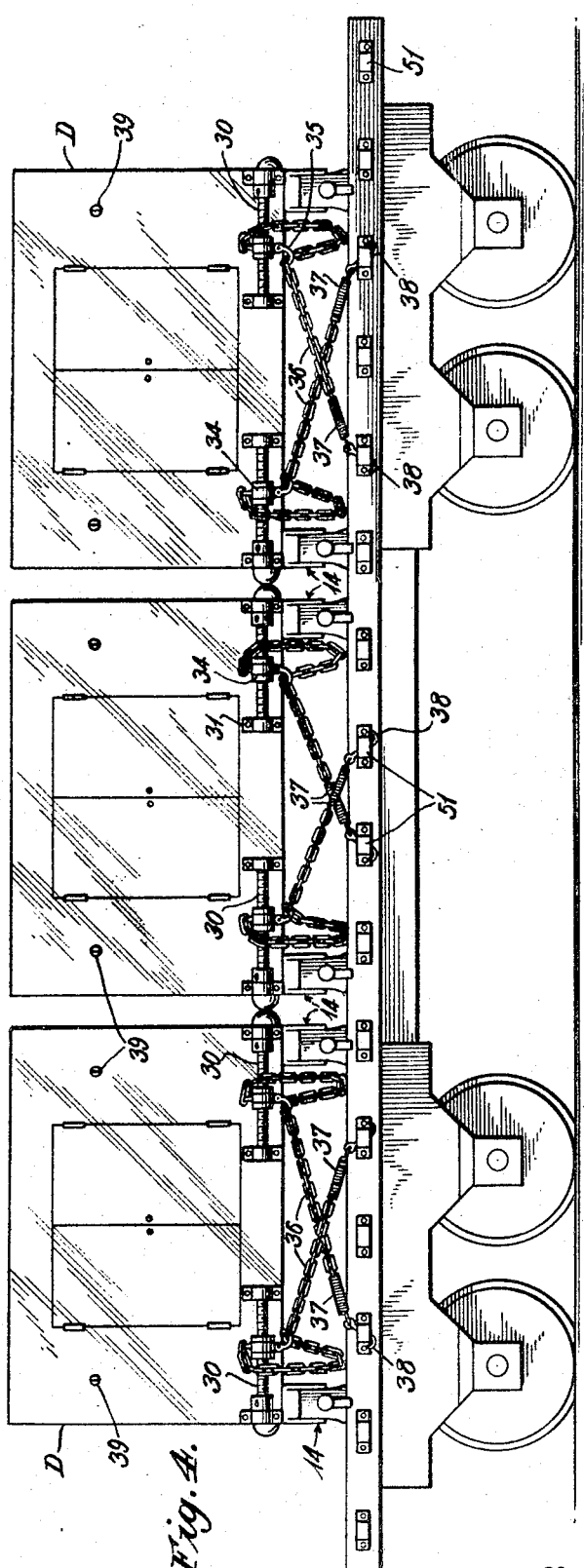
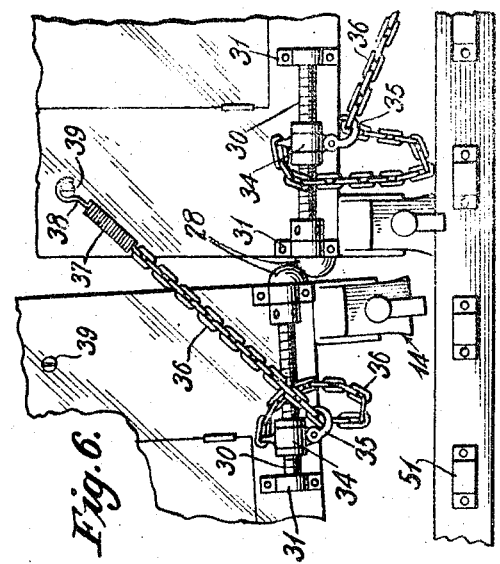
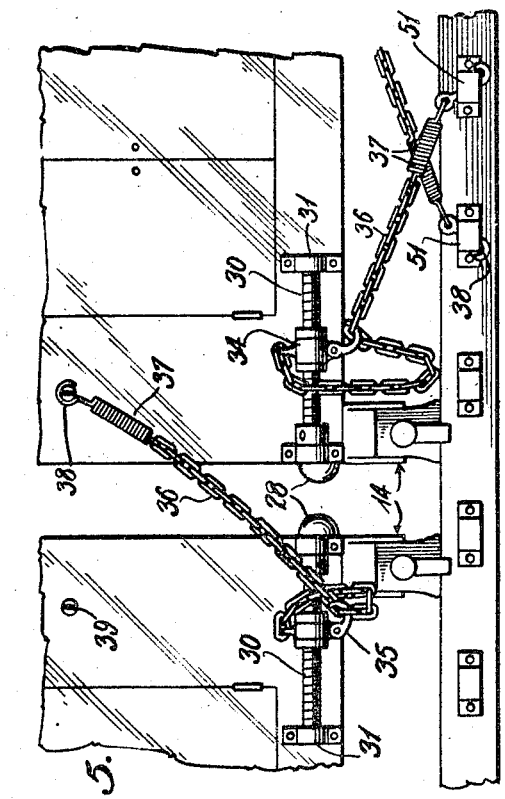

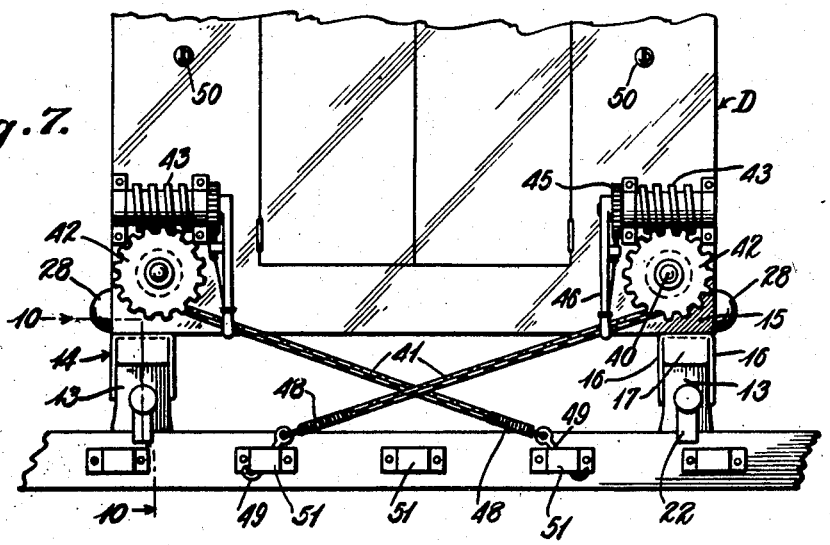
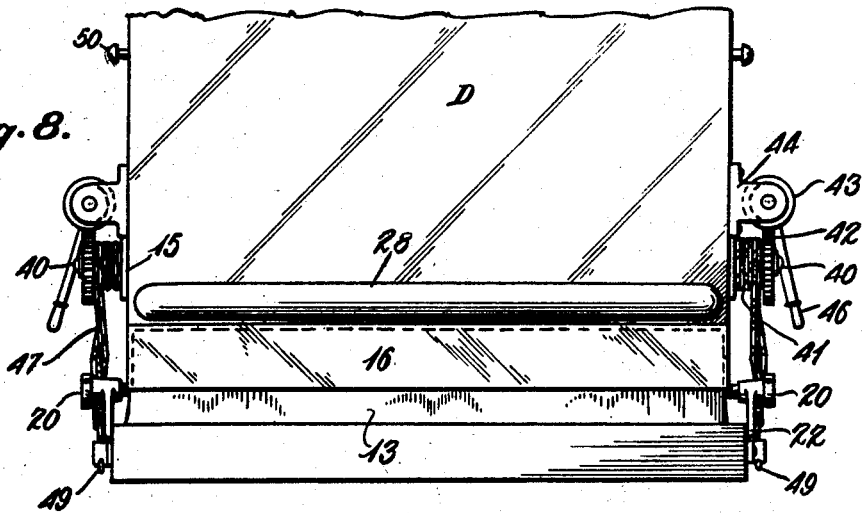
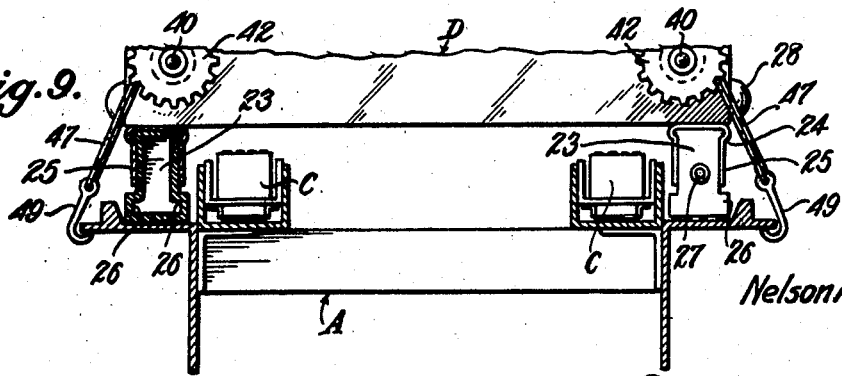

Patented Jan. 17, 1939

2,144,410

UNITED STATES PATENT OFFICE 2,144,410

LOAD-BOX AND METHOD OF TRANSPORTING THE SAME

Nelson A. Ludington, New Haven, Conn.

Application January 22, 1935, Serial No. 2,906

20 Claims. (Cl. 105—366)

This invention relates to new and useful improvements in load-boxes, especially designed for handling L. C. L. shipments, and a method of transporting said load-boxes.

The primary object of the invention is to provide a form of load-box especially designed for handling L. C. L. ("less than carload lot") shipments.

A further important object of the invention is to provide a method of transporting load-boxes on railway flat cars, or the like, so that a plurality of said load-boxes may be bonded together and to the transporting device so that all of the load-boxes will move as a single mass, under the influence of inertia, to absorb the shocks, strains, and stresses developed during transportation.

Still a further important object of the invention is to provide a method for transporting a plurality of load units so that any differences in weight between the various units will be taken care of to cause the forces developed by inertia to act uniformly on all of the load units.

Another object of the invention is to provide novel forms of power applying mechanism which are adapted to be secured to load-boxes for enabling the boxes to be shifted or manipulated while resting upon a railway flat car, or the like, to enable the said load-boxes, after being deposited upon the said flat car, to be moved into their final resting places.

A further important object of the invention is to provide power applying mechanism to be attached to load-boxes for enabling the load-boxes to be secured to a transporting device, such as a railway flat car.

Still another object of the invention is to provide novel forms of shock absorbing skids for load-boxes.

Another object of the invention is to provide shock absorbing bumpers for the walls of load-boxes.

A still further object of the invention is to provide a novel form of restraining mechanism for limiting lateral movement of a load-box relative to a transporting flat car, or the like.

Other objects and advantages of the invention will be apparent during the course of the following description.

In the accompanying drawings forming a part of this specification and in which like numerals are employed to designate like parts throughout the same:

Figure 1 is a side elevational view of a transportation truck with a plurality of load-boxes, embodying this invention, arranged thereon and with one of said load-boxes conditioned to be transferred to a railway flat car;

Figure 2 is a fragmentary rear elevational view of a transportation truck showing a load-box located thereupon and supported by transferring mechanism in condition to be discharged from said truck, the position of said load-box upon said truck being an alternate disposition from that shown in Figure 1.

Figure 3 is a plan view of a railway flat car with two load-boxes positioned thereupon and suitably secured thereto and with a third load-box supported upon the rear portion of a transportation truck and in position to be transferred to the flat car;

Figure 4 is a side elevational view of a railway flat car with three of the load-boxes embodying this invention properly positioned thereupon and tied thereto and to each other in a manner to facilitate transportation;

Figures 5 and 6 are fragmentary side elevational views of two load-boxes arranged upon a railway flat car and illustrate a portion of the procedure of properly arranging the load-boxes relative to each other to facilitate safe transportation;

Figure 7 is a fragmentary side elevational view of a load-box properly secured to a railway flat car, or the like;

Figure 8 is a similar view to Figure 7 but taken at right angles thereto;

Figure 9 is a fragmentary detailed elevational view disclosing the use of power applying mechanism attached to a load-box and employed for anchoring the load-box to a transportation truck of the type disclosed in Figures 1 and 2; and Figure 10 is a fragmentary vertical sectional view taken on line 10—10 of Figure 7.

In my Patents No. 1,910,398, issued May 23, 1930, and No. 2,117,067 issued May 10, 1937, I have disclosed and claimed two different forms of transportation devices especially designed for handling L. C. L. containers or load-boxes to enable these load-boxes to be transported on relatively short hauls between railway freight stations and shippers or consignees. These transportation devices comprise mobile or self-propelled vehicles which are provided with load-transferring mechanism by means of which load-boxes, or the like, may be moved onto and off of the transportation devices from loading platforms to railway flat cars, and vice versa.

The present invention relates to different forms of load-boxes adapted to be handled by the transportation trucks disclosed in my aforementioned patents.

In Figures 1 and 2 there is disclosed one form of transportation truck which is designated in its entirety by the reference character A. This truck includes load supporting surfaces or rails B which are adapted to be engaged by skids, or the like, carried by load-boxes to enable the load-boxes to be suitably carried by the truck. Arranged inwardly of these load supporting surfaces or rails are inflatable bags C, or the like, which constitute a part of the load transferring mechanism carried by the truck A. This transferring mechanism is specifically disclosed and claimed in my aforementioned Patent No. 2,117,067 and, therefore, will not be described in detail in this case. This transfer mechanism is designed for moving the load-boxes D onto the truck A from loading platforms, or the like, and to discharge the load-boxes onto a railway flat car, such as is designated by the reference character E in Figure 1.

In Figure 3 there is disclosed a flat car E with two load-boxes D suitably arranged thereon and properly tied thereto. These load-boxes are positioned to provide a space between the same for receiving an additional load-box. This figure is employed to illustrate the manner in which the truck A may be employed for transferring the third load-box from the truck into the space between the previously positioned load-boxes, and as designated by the dot-and-dash lines D'.

In Figures 1 and 2 the load boxes D are illustrated as having rigid legs 12 arranged at the four corners of the same and designed for retaining the load-boxes in an elevated position with respect to a surface on which the boxes are arranged. This spacing of the load-boxes from a supporting surface enables the transferring mechanism of the truck A to be inserted beneath the box and in the space between the supporting legs, the bottom of the box, and the supporting surface on which the box is located.

In Figures 4 to 8, inclusive, and 10, I have disclosed a modified form of supporting skid for a load-box. In this form of the invention a load-box is provided at opposite sides with skids in the form of bars or elongated blocks of solid, soft rubber 13. These bars or elongated blocks are secured to the bottom surface of a load-box D by metallic troughs or cups designated in their entirety by the reference character 14. Each of these troughs or cups consists of a base wall 15 with opposed side walls 16 and relatively narrow, opposed end walls 17. The rubber blocks or bars are suitably surface-bonded to these troughs or pockets 14. The relatively deep side walls 16 fun..ion to reinforce the rubber blocks or bars to prevent collapse of the same under an extremely heavy load and to limit side sway of the load-box due to yielding of the rubber blocks or bars. The relatively shallow end walls 17 function to reinforce the rubber blocks or bars and to restrict sway of the load-boxes in a direction longitudinally of the rubber skids.

Associated with each end of each rubber block or bar 13 is an embedded sleeve 18 which is internally screw-threaded to receive a bolt 19. Each bolt is provided with a head 20 having tool receiving sockets 21 formed in its periphery to enable the screw to be rotated. Rotatably supported on each one of the screws 19, between its head 20 and the outer end of its sleeve 18, is a clamping lug 22. The function performed by these clamping lugs and their operating mechanism will be described at a later point.

In Figure 9 there is disclosed a further modified form of skid for supporting the load-boxes. This skid consists of an inflatable bag 23 which is secured to the load-box by means of a channel-shaped metallic cup 24, or the like. This cup is provided with longitudinally extending side walls 25 which function to reinforce the inflatable bag 23 and to restrict side sway of the load-box supported on two of these skids. The lower portion of the inflatable bag 23 is enlarged transversely to provide lateral wings 26. These wings or shoulders are arranged outwardly of the longitudinal edges of the side walls 25 of the metal cups 24 and are spaced from these longitudinal edges when the bags are fully inflated by means of the valve device 27. In case of puncture or deflation of the bag from any other cause, the side walls 25 of the retaining cup 24 will prevent complete collapse of the bag. It will be seen, by inspecting Figure 9, that one of these inflatable skid structures is employed at each side of the load-box D. In the various figures, all of the load-boxes are illustrated as having associated with opposite side walls bumper devices 28. These bumper strips or devices may be formed of any resilient or yieldable material, such as of solid rubber or inflated rubber bags. They are arranged on the various load boxes so that, when a plurality of boxes are supported on a common surface, the various bumper devices will be arranged in the same horizontal plane, or the bumpers of any two load-boxes will register horizontally.

In Figures 1 to 6, inclusive, there is disclosed one form of power applying mechanism which is attached to each of the four corners of a load-box. This power applying mechanism consists of a threaded shaft 30 journaled in end bearings 31. Rigidly fastened to one end of each of these threaded shafts is a head 32 which is provided with a suitable number of tool receiving sockets 33 to enable the shaft to be rotated. Threaded on each shaft is a nut 34 which has fastened thereto a hook 35 and one end of a section of chain 36. The outer end of each chain section 36 has attached thereto an elastic section 37 which may take the form of a coiled spring. The extremity of this elastic section has a hook 38 fastened to the same. Each load-box is provided with a pin 39 carried by the wall of the same and located above the power applying device. It will be understood that there are four of these power applying devices for each load-box and that a pin 39 is arranged above each power applying device.

In Figures 7 to 9, inclusive, I have disclosed a modified form of power applying device. This device consists of a shaft 40 mounted upon the wall of a load-box to extend laterally therefrom. Journaled on the shaft 40 is a drum 41 which has a worm wheel 42 mounted at its outer end. Each worm wheel meshes with a worm 43 rotatably supported at its opposite ends by bearing brackets 44. A suitable ratchet mechanism 45, which includes an operating lever 46, is carried by the worm 43 and functions to permit rotation of the worm in either direction. The drum 41 has associated therewith, for being wound and unwound with respect thereto, a section of chain 47. This chain section has a coiled spring 48 connected to its outer end. A hook 49 is attached to the extremity of the coiled spring 48. It will be understood, by examining Figures 7 to 9, inclusive, that a load-box equipped with this form of power applying mechanism has one of these power applying devices mounted on each of the four corners of the same. A pin 50 also is provided for each one of these power applying devices.

In Figures 4 to 6, inclusive, I have illustrated a method of transporting or shipping the load-boxes embodying this invention on a flat car, or the like. This method is intended to enable a plurality of load-boxes to be secured to a flat car and to be associated with each other in such a manner that all of the load-boxes on a single flat car will move as a unit, on their resilient supporting skids and relative to the flat car, to absorb shocks, strains, and stresses which occur during transportation and other manipulations of the flat car.

It is to be understood that, while I have only shown three load-boxes D associated with a flat car in Figures 3 and 4, these load-boxes, especially designed for handling L. C. L. shipments, are usually of a size which will enable six of the boxes to be placed in longitudinal alignment upon a conventional railway flat car. The illustration of three load-boxes to a car has been adopted merely for convenience in disclosing the invention.

It will be appreciated that, in handling L. C. L. shipments in load-boxes, a wide difference in weight may exist between the various loads contained in the different boxes. For example, one load-box may contain a shipment of straw hats and the entire weight of this load-box will be comparatively small. Another load-box positioned upon the same flat car may contain a shipment of books, which, of course, will provide a load having a total weight much greater than the load of straw hats. These two different types of loads will be affected to a vastly different degree by the forces of inertia.

The method embodying this invention is intended to tie these various load-boxes, with their greatly varying weights, to the flat car and to each other so that all of the load-boxes will move as a unit or a single mass relative to the flat car to absorb shocks, stresses, and strains. This bonding or tying of all of the load-boxes to the flat car and to each other also will permit the shippers to use less care in packing their load-boxes, for the tying of all of the load-boxes together and to the flat car so that they will move as a single unit or mass will prevent shifting of the contents of a carelessly packed box.

This method is carried out in the following manner: The first load-box to be discharged from a transporting truck may be deposited on the flat car in the general vicinity of the portion of the flat car upon which it is intended to finally rest for its trip. By means of suitable ones of the power applying devices, this load-box may be shifted relative to the flat car until it is moved into its desired final location. This shifting of the load-box may be accomplished by engaging the hooks, carried by the ends of the chain sections of suitable power applying devices, into suitable stake sockets 51 of the flat car. All standard railway flat cars are provided with a plurality of these sockets arranged along each longitudinal edge. After engaging the hooks 38 of the power applying devices to be employed in suitable stake sockets 51, the slack in each chain should be taken up by engaging the hook 35 with a suitable link of the chain. By rotating the threaded shaft 30 for each of the power applying devices being employed in a proper direction to cause longitudinal travel of the nut 34 relative to the shaft 30, the load-box may be moved sufficiently to properly locate the same with respect to the flat car. After the load-box has been properly positioned, all four power applying devices should be attached to stake sockets 51 by means of their end hooks 38 and in the manner illustrated in Figure 4.

By rotating the various threaded shafts 30 of these power applying devices, the four chains 36 may be tensioned or drawn taut to stretch or expand the coiled spring sections 37. This tightening of the chains may be carried on to a sufficient extent to place the various resilient skids 14 under compression. It will be appreciated that, when the load-box is tied down by these four power applying devices, the load-box will be permitted to sway to a limited extent relative to the flat car. To prevent transverse shifting of the load-box relative to the flat car, the clamping lugs 22, associated with each end of each skid, should be tightened until these lugs forcefully engage the side edges of the platform of the flat car, as illustrated in the detailed disclosure of Figure 10. This first load-box then is in readiness for shipment.

The next load-box to be deposited upon the flat car is placed in the general vicinity of the previously-loaded and tied-down load-box. The proper ones of the power applying devices then may be employed to move this second load-box into general alignment with the first load-box and relatively close to the same by engaging the end hooks of these power applying devices in the stake sockets 51 of the flat car. The end hooks 38 of the chain sections 36 then should be disconnected from the stake sockets 51 and connected to the adjacent pins 39 of the tied-down load-box. This step is illustrated in Figure 5. The threaded shafts 30 then should be rotated to move the nuts 34 longitudinally of the shafts 30 away from the first tied-down load-box. This will cause the second load-box to be drawn toward the first load-box and to be canted relative to the flat car due to the elevated positions of the pins 39. This operation is continued until the two load-boxes are arranged relative to each other as illustrated in Figure 6 or until the resilient bumpers 28 are arranged in overlapped relation. By reversing the rotation of the threaded shafts 30, the power applying devices will no longer support the second load-box in its canted or partially elevated position, and the load-box will be permitted to settle until both of its supporting skids are in engagement with the flat car. The engaged bumpers of these two load-boxes then will be placed under compression. The four power applying devices of this second load-box then should be employed in the manner previously described to tie the second load-box to the flat car, preferably with its resilient skids under compression.

All of the remaining load-boxes to be transported on this flat car should be manipulated in the same manner as described in connection with the second load-box or so that the resilient bumpers 28 between adjacent pairs of load-boxes will be engaged with each other and placed under compression and with all of the skids supporting the load-boxes also placed under compression. The various clamps illustrated in Figure 10 also should be tightened to engage the side edges of the flat car. Due to the resiliency of the skids and bumpers and the coiled spring sections of the chains 36, the various load-boxes will be bonded or tied to the flat car and to each other so that they will move as a single unit or mass relative to the flat car to absorb shocks, strains, and stresses developed as a result of travel, switching, and the like, of the flat car.

Without detailed explanation, it will be understood that the power applying device disclosed in Figures 7 to 9, inclusive, may be employed in the same manner as the power applying device disclosed in Figures 1 to 6, inclusive, for manipulating and tying down the load-boxes. By proper manipulation of the levers 46 of this modified form of power applying device, the chain section for each device may be tightened or loosened as desired.

Figure 9 discloses the manner of using either of the power applying devices for tying a load-box to a transportation truck, such as shown in Figure 1. This tying down of a load-box to a truck may be accomplished merely by engaging the end hooks 49 with a suitable portion of the truck body, such as the side edges of the body platform.

Figures 1 and 2 disclose an additional use for the pins 39 carried by the load-boxes. When the power applying devices are not being used for tying a load-box to a truck, a flat car, or the like, and are not being used for shifting the load-box relative to a supporting surface to properly position the box for storage, transportation, or the like, the end hooks carried by the chain sections may be engaged with the pins 39. Figure 1 clearly illustrates this arrangement of the chains of the power applying devices.

It is to be understood that the forms of this invention herewith shown and described are to be taken as preferred examples of the same and that various changes in the shape, size, and arrangement of parts may be resorted to without departing from the spirit of the invention or the scope of the subjoined claims.

Having thus described the invention, I claim:

1. In combination, a load-box adapted to be loaded onto a railway flat car, or the like, for transportation, resilient skids for supporting said load-box, resilient bumpers secured to side walls of said load-box, means carried by said load-box constructed and arranged to move said load-box relative to said flat car into final transporting position with a resilient bumper compressed against an abutment on the car and to forcefully tie down said load-box to place said resilient skids under compression, and means carried by the skids and engageable with the flat car for holding the load-box against movement transversely of said flat car.

2. In combination, a load-box adapted to be loaded onto a railway flat car, or the like, for transportation, resilient skids for supporting said load-box, means carried by said load-box constructed and arranged to move said load-box relative to said flat car into final transporting position and to forcefully tie down said load-box to place the resilient skids under compression, and means carried by the skids and engageable with the flat car for holding the load-box against movement transversely of said flat car.

3. In combination, a load-box, a threaded shaft rotatably journaled in bearings on a wall of the load-box, a nut mounted on the shaft to travel longitudinally thereof, a section of chain connected to the nut, a hook carried by the end of said chain, and lever means for rotating said shaft.

4. In combination, a load-box, a resilient skid for supporting the load-box, and clamping means adjustably carried by each end of the skid.

5. In combination, a load-box, a pair of resilient skids for supporting the load-box, and a clamping lug adjustably carried by each end of each skid.

6. The method of loading a plurality of independent load units on a transportation device so as to absorb stresses, strains, and shocks resulting from movement of the device, comprising, arranging a plurality of load units in alignment on said device, interposing resilient devices between adjacent load units and between each load unit and said transportation device, and securing said load units to said transportation device so as to place said resilient means under compression and yieldably restrain the movement of each load unit relative to said transportation device and relative to each other.

7. Freight transportation means, comprising, a conveyance, a load carried by said conveyance comprising a plurality of individual load-boxes, said load-boxes having adjacent portions thereof provided with resilient bumpers in yielding contact, resilient means supporting said load boxes on said conveyance and means associated with said boxes and said conveyance constructed and arranged to resiliently tie said load-boxes to said conveyance and relatively to each other so that said load will ride upon said conveyance substantially as a single load unit.

8. Freight transportation means, comprising, a railway car, or the like, a load carried by said railway car and comprising a plurality of individual load-boxes, resilient means supporting said load boxes on said conveyance, resilient shock absorbing means carried by said load-boxes and interposed between adjacent sides thereof, and means carried by said load-boxes constructed and arranged to resiliently tie said load-boxes to said car and relatively to each other with the shock absorbing means of adjacent boxes in engagement so that said load will ride upon said car substantially as a single load unit, said means including an elastic element.

9. A load-box adapted to be loaded for transportation onto a railway car, or the like, comprising, resilient skids secured to said load box and arranged to support the same, resilient bumpers secured to the side walls of said load-box, and means including an elastic element carried by said load-box constructed and arranged for moving said load-box relative to said car into final transporting position with a resilient bumper compressed against an abutment on the car and for forcefully tying down said load-box on said car so as to place said resilient skids under compression.

10. A load-box adapted to be loaded for transportation onto a conveyance, comprising, resilient means secured to said load-box and arranged to support the same on a conveyance, resilient bumpers mounted on the side walls of said load-box, and means including a yieldable element carried by said load-box constructed and arranged to move said load-box relative to said flat car into final transporting position with a resilient bumper engaged with a bumper of an adjacent load-box and for forcefully tying down said load-box on said conveyance to place said resilient supporting means under compression.

11. A load-box adapted to be loaded for transportation onto a conveyance, comprising, resilient means for supporting said load-box on a conveyance, resilient bumpers secured to the side walls of said load-box, and means including an elastic element operatively associated with said load-box to hold said load-box against substantial movement relative to said conveyance with a resilient bumper compressed against an abutment on said conveyance and for forcefully tying down said load-box on said conveyance to place said resilient supporting means under compression.

12. A load-box adapted to be loaded for transportation onto a railway car, comprising, resilient skids mounted on said load-box for supporting said load-box on a car, resilient bumpers secured to the side walls of said load-box, and means including a yieldable element operatively associated with said load-box and car to move said load-box relative to said car into final transporting position with a resilient bumper arranged for compression against a bumper on an adjacent load-box and for forcefully tying down said load-box to place said resilient skids under compression.

13. A load-box, as defined in claim 12, in which the resilient skids are of a length corresponding substantially to that of the sides of said load-box.

14. A load-box, as defined in claim 12, in which the resilient skids consists of a pair of skids, each including a solid rubber block and a reinforcing cup for connecting the block to the load-box.

15. A load-box, as described in claim 12, in which the resilient skids consist of a pair of skids, each of which skids comprises an inflatable bag.

16. A load-box, as described in claim 12, in which the yieldable element is a spring.

17. A load-box, as described in claim 12, in which the means for moving the load-box relative to the car and for tying the load-box in place on the car, includes, spaced bearings mounted on a wall of the load-box, a threaded shaft rotatably journaled in said bearings, a nut mounted on said shaft for travel longitudinally thereon, a section of chain, said section of chain and said yieldable element being adapted for forming a connection between said nut and car, and lever means for rotating said shaft.

18. A load-box, as described in claim 12, in which the means for moving the load-box relatively to a car and for tying the same in place on a car, includes, a drum rotatably carried by a wall of said load-box, a chain connected to the drum to be wound and unwound upon said drum, said yieldable element being connected with the free end of said chain, a hook connected with said yieldable element, and means for rotating said drum in opposite directions.

19. A load-box, such as defined in claim 12, in which the resilient skids comprise a body and reinforcing walls engaging the opposite sides of said body to restrict side sway of the load-box on said skids.

20. A load-box, such as defined in claim 12, in which the resilient skids comprise an inflatable bag enlarged at its lower longitudinal edge portion and reinforcing plates engaging the opposite sides of said inflatable bag to restrict side sway of the load-box on said skids and to engage said enlargement to prevent complete collapse of the bag upon deflation.

NELSON A. LUDINGTON.